(12) United States Patent
Jin

(10) Patent No.: US 11,603,746 B2
(45) Date of Patent: Mar. 14, 2023

(54) METHOD FOR SELECTION OF IMPROVED HYDROCARBON RECOVERY AGENTS FOR HYDROCARBON RESERVOIRS

(71) Applicant: Alchemy Sciences, Inc., Houston, TX (US)

(72) Inventor: Luchao Jin, Houston, TX (US)

(73) Assignee: ALCHEMY SCIENCES, INC., Houston, TX (US)

( * ) Notice: Subject to any disclaimer, the term of this patent is extended or adjusted under 35 U.S.C. 154(b) by 0 days.

(21) Appl. No.: 17/228,161

(22) Filed: Apr. 12, 2021

(65) Prior Publication Data

US 2021/0324719 A1  Oct. 21, 2021

Related U.S. Application Data

(60) Provisional application No. 63/012,638, filed on Apr. 20, 2020.

(51) Int. Cl.
*E21B 43/267* (2006.01)
*E21B 47/002* (2012.01)

(52) U.S. Cl.
CPC .......... *E21B 43/267* (2013.01); *E21B 47/002* (2020.05); *E21B 2200/20* (2020.05)

(58) Field of Classification Search
CPC ... E21B 43/267; E21B 47/002; E21B 2200/20
See application file for complete search history.

(56) References Cited

U.S. PATENT DOCUMENTS

2012/0211089 A1   8/2012  Piri
2019/0309216 A1*  10/2019  Jin ........................ E21B 43/16

* cited by examiner

*Primary Examiner* — Crystal J. Lee
(74) *Attorney, Agent, or Firm* — Ewing & Jones, PLLC

(57) ABSTRACT

A physical modeling method that includes providing a reservoir core plug, the reservoir core plug having a wellbore interface end, an outlet interface end, and a cylindrical face and saturating the reservoir core plug with hydrocarbon and brine to form a saturated core plug. The method also includes positioning the saturated core plug within a flooding apparatus and pumping the fracturing fluid through saturated core plug to displace a portion of the hydrocarbon to form a displaced hydrocarbon plug. In addition the method includes positioning the displaced hydrocarbon plug in an imbibition cell and conducting an imbibition test to form an imbibed core plug having brine and hydrocarbon. Further the method includes positioning the imbibed core plug in core-flooding apparatus and displacing a portion of the brine and hydrocarbon from the imbibed core plug.

11 Claims, 6 Drawing Sheets

Stage 1:

Stage 2:

Stage 3:

METHOD FOR SELECTION OF IMPROVED HYDROCARBON RECOVERY AGENTS FOR HYDROCARBON RESERVOIRS

This application is a non-provisional application which claims priority from U.S. provisional application No. 63/012,638, filed Apr. 20, 2020, which is incorporated by reference herein in its entirety.

BACKGROUND

Field

This disclosure relates generally to the field of treatment fluids used in hydraulic fracturing subterranean formations during hydrocarbon recovery. More specifically the disclosure relates to methods for selecting chemicals used in treatment fluids.

Background Art

Hydraulic fracturing is a technique used to create a high permeability conduit that connects the hydrocarbon bearing formation and the wellbore. Generally, in a hydraulic fracturing operation, a fracturing fluid transfers the high hydraulic fracturing pressure to fracture the subterranean formation and carry proppants to keep open the created fractures. Water-based hydraulic fracturing fluids are commonly used. Hydrocarbon recovery agents, such as surfactants, microemulsion and nanoparticles are also traditionally added to the fracturing fluid to modify the fluid properties of aqueous and hydrocarbon phases of the fluid present in the subterranean formation, as well as the rock surface, to favor the flow of hydrocarbons.

SUMMARY

The disclosure includes a physical modeling method that includes providing a reservoir core plug, the reservoir core plug having a wellbore interface end, an outlet interface end, and a cylindrical face and saturating the reservoir core plug with hydrocarbon and brine to form a saturated core plug. The method also includes positioning the saturated core plug within a flooding apparatus and pumping the fracturing fluid through saturated core plug to displace a portion of the hydrocarbon to form a displaced hydrocarbon plug. In addition the method includes positioning the displaced hydrocarbon plug in an imbibition cell and conducting an imbibition test to form an imbibed core plug having brine and hydrocarbon. Further the method includes positioning the imbibed core plug in core-flooding apparatus and displacing a portion of the brine and hydrocarbon from the imbibed core plug.

The disclosure also includes a multiple proppant concentration method that includes forming a plurality of proppant fracture assemblies, the proppant assemblies including a high proppant concentration, intermediate proppant concentration, low proppant concentration, or no proppant concentration. Each proppant fracture assembly includes a core sample and a concentration of proppant between 0 and 10 layers, wherein the combination of proppant and core sample is a propped sample. The method also includes covering each of the propped samples to form a wrapped core sample and positioning the wrapped core samples in a core-flooding apparatus integrated with an imaging system. Also, the method includes pumping a fracturing fluid into each of the wrapped core samples from a first direction within a core flooding system, wherein the fracturing fluid includes a hydrocarbon recovery agent. The method also includes closing the inlet and outlet of the core flooding system, opening the core flooding system, and pumping fracturing fluid and hydrocarbon from a second direction in the core flooding system. In addition, the method includes visualizing a fluid saturation map in each proppant fracture assembly and determining effective permeability of each proppant fracture assembly.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily reduced for clarity of discussion.

DETAILED DESCRIPTION

Figure 1:
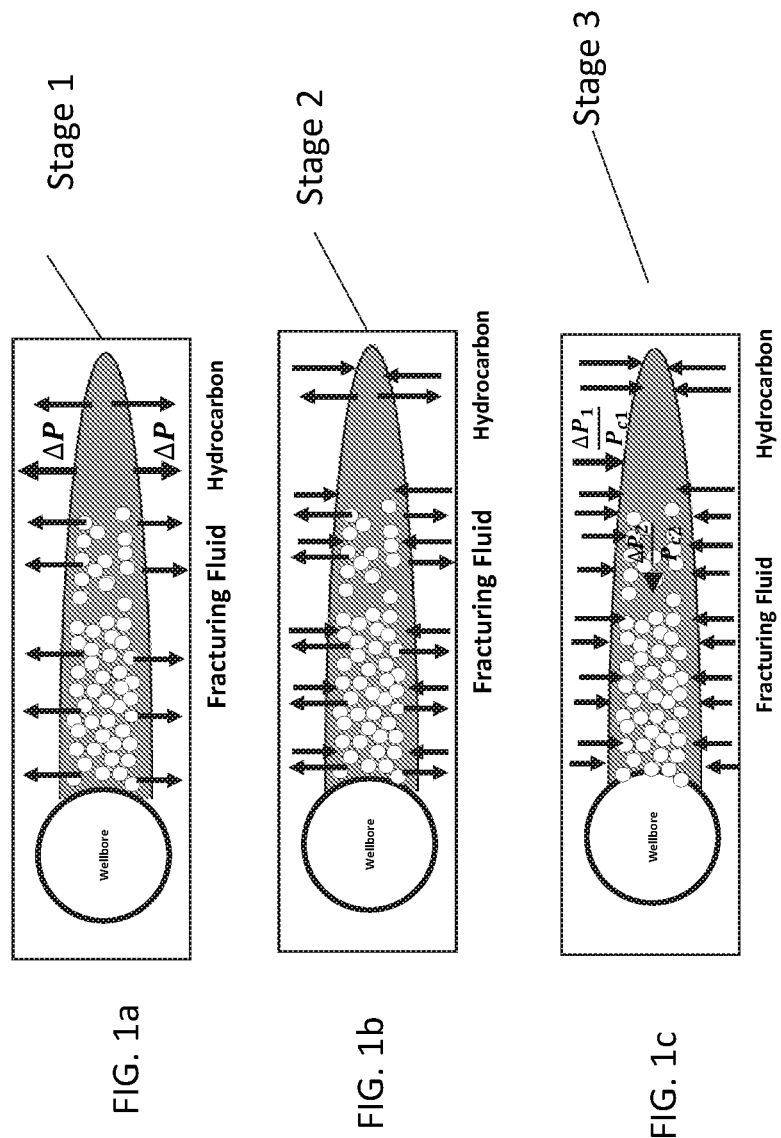
FIGS. 1a-1c are a graphical depiction of a hydraulic fracture having three stages of pressure gradient and fluid displacement of a hydraulic fracturing operation.

The following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

This disclosure is not limited to the embodiments, versions, or examples described, which are included to enable a person having ordinary skill in the art to make and use the disclosed subject matter when the information contained herein is combined with existing information and technology.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations. For example, if the detailed description recites a range of from 1 to 5, that range includes all iterative ranges within that range including, for instance, 1.3-2.7 or 4.9-4.95.

The present disclosure describes a process for selection, analysis, screening, and evaluation of the performance of a chemical agent for improving hydrocarbon recovery in hydrocarbon bearing reservoirs.

To evaluate and prove the performance of the hydrocarbon recovery agents in the laboratory, it may be desirable for evaluation methods to physically simulate the multiphase fluid flow in the matrix and the hydraulic fracture and to replicate the same stages in terms of pressure gradient and fluid flow directions between the formation matrix and the wellbore. The evaluation may be segregated into three stages from the start of hydraulic fracturing operation to the production of fluids. The first stage represents the hydraulic fracturing process in which the pressure in the wellbore is greater than the pore pressure of the formation. In this first stage a fracture is created, fracturing fluid penetrates into the pore network of the matrix, and the hydrocarbon is displaced. The second stage represents the well shut-in process in which the pressure of the wellbore approaches equilibrium with the formation such that fluids are reconfigured in the matrix and fracture. The third and last stage represents the production of the well in which fluids flow out of the matrix through the hydraulic fracture to the wellbore by drawdown pressure.

During fracturing operations, hydraulic fractures are created to connect the formation and the wellbore in order to produce hydrocarbons from the formation. Without being bound by theory, FIGS. 1a-1c depict three stages of pressure gradient conditions and fluid flow directions between fracture and formation in a hydrocarbon reservoir. In Stage 1, as shown in FIG. 1a, a hydraulic fracture is created and the hydrostatic pressure of the fracturing fluids in the fracture is higher than the pore pressure of the hydrocarbons in formation matrix. In stage 1, the fracturing fluids, driven by the pressure gradient, penetrate into the formation and displace the hydrocarbon present therein. In Stage 2, as shown in FIG. 1B, the hydraulic fracturing operation is stopped, resulting in equilibrium between the pressure in the hydraulic fracture with the pore pressure of the formation matrix. In Stage 2, fracturing fluids imbibe into the pore space of the matrix from the hydraulic fractures because of the capillary imbibition. In Stage 3, as shown in FIG. 1c, the wellbore is opened for return of fracturing fluid and hydrocarbon production. In Stage 3, the pore pressure of formation matrix is higher than that of the hydraulic fracture resulting $\Delta P_1$ as shown in FIG. 1c, and the hydraulic fracture pressure is higher than the pressure of the wellbore resulting $\Delta P_2$ as shown in FIG. 1c. The $P_{c1}$ and $P_{c2}$ in FIG. 1c are the capillary pressure on the matrix-fracture interface and in the hydraulic fracture, respectively, due to the multiphase flow of oil, gas and water. Therefore, in Stage 3, all fluids, including fracturing fluid, hydrocarbon, gas and initial formation water flow from the matrix to the fracture then to the wellbore.

A method is herein described to determine the efficacy of a hydrocarbon recovery agent by physically modeling the interface of the formation matrix and the fracture, as well as the created hydraulic fracture of the three stages depicted in FIGS. 1a-1c, referred to as the physical modeling method. In certain embodiments, a reservoir core plug is used to simulate the formation. The interface of the formation matrix and the fracture is represented by a face of the reservoir core plug. The core plug may be cleaned by solvent, saturated with hydrocarbon and brine to the initial saturation stage of the reservoir core plug, and aged to establish an initial wetting state to form an aged saturated core plug. In other embodiments, the core plug is cleaned by solvent, saturated with hydrocarbon and brine to the initial saturation stage of the reservoir core plug and not aged to form a non-aged saturated core plug. Collectively, the aged saturated core plug and the non-aged saturated core plug are referred to as "saturated core plugs." The saturated core plug is transferred to a high-pressure high-temperature two- and three-phase core flooding apparatus.

Figure 2:
FIG. 2 is a graphical depiction of a laboratory core flood test that physically simulates Stage 1 of FIG. 1a-1c.

FIG. 2 depicts a laboratory core flood test that simulates Stage 1. Fracturing fluid with or without a hydrocarbon recovery agent is pumped into the saturated core plug from one of end interfaces of the saturated core plug, hereinafter referred to as the wellbore interface. Under the pressure difference/gradient, fracturing fluid then penetrates into the saturated core plug from the wellbore interface. The displaced hydrocarbon is collected at the outlet, i.e., the opposite end interface from wellbore interface, hereinafter referred to as the outlet interface, and the volume of the displaced hydrocarbon through the outlet interface is recorded. Displacing the hydrocarbon results in the formation of the displaced hydrocarbon plug, which is then moved out of the high-temperature high-pressure core flooding apparatus. The cylindrical face and the outlet interface of the displaced hydrocarbon plug are sealed such that only the wellbore interface face remains open, as depicted in FIG. 2.

Figure 3:
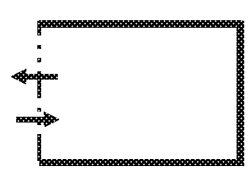
FIG. 3 is a graphical depiction of a laboratory core spontaneous imbibition test that physically simulates Stage 2 of FIG. 1B.

As shown in FIG. 3, the displaced hydrocarbon plug is then placed into a high temperature high pressure imbibition cell to which fracturing fluid with and without a hydrocarbon recovery agent is added to conduct a spontaneous imbibition test simulating the Stage 2 process. The hydrocarbon recovery is calculated by measuring the weight of the core plug before and after the imbibition process. The imbibition test results in the formation of an imbibed core plug.

Figure 4:
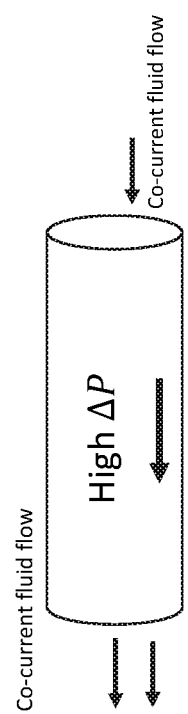
FIG. 4 is a graphical depiction of a laboratory core flood test that physically simulates Stage 3 of FIG. 1c.

To simulate Stage 3, the imbibed core plug is then placed in a core-flooding apparatus, such as that described in U.S. Patent Application Publication 2012/0211089. In Stage 3, the pressure gradient in the reservoir is from the matrix to the hydraulic fracture. Therefore, as shown in FIG. 4, hydrocarbon is pumped from the outlet interface and both of hydrocarbon and brine solution are displaced out of the imbibed core plug through the wellbore interface. Hydrocarbon and brine recovery versus time is collected and effective permeability of hydrocarbon is calculated.

Figure 5:
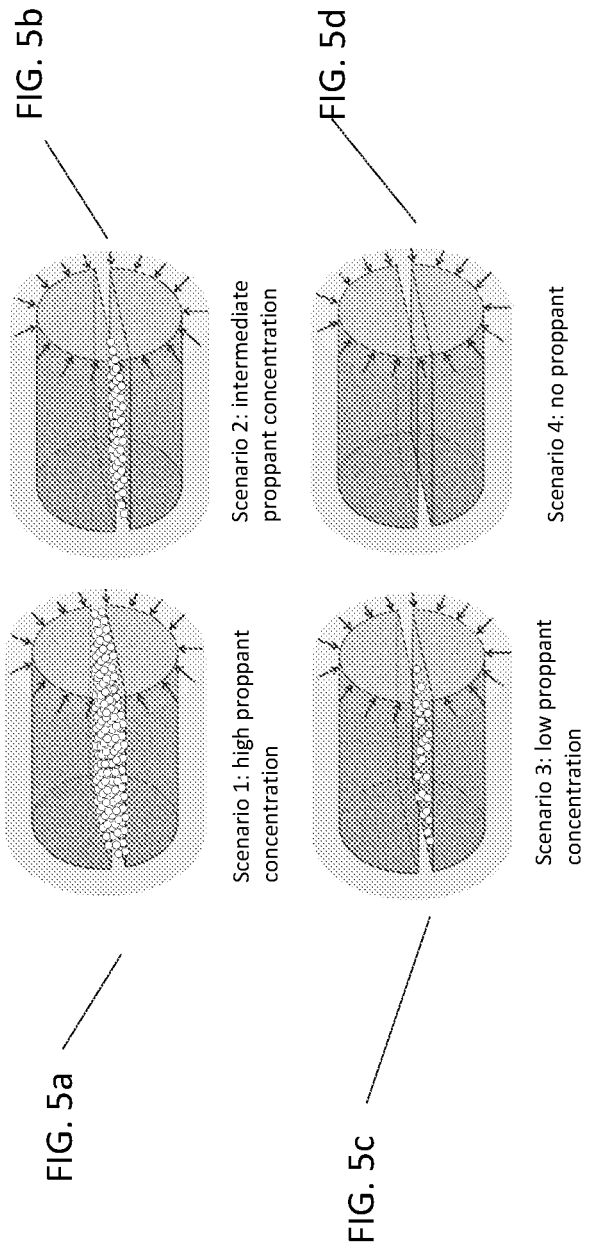
FIGS. 5a-5d are graphical depictions of a laboratory split core flood test that physically simulates fluid flow in the hydraulic fracture during four different proppant arrangement scenarios.

In certain embodiments, in addition to or in lieu of the physical modeling method, a multiple proppant concentration method may be used. In the multiple proppant concentration method, a proppant-packed fracture assembly is created to simulate the multiphase flow of the three stages in the hydraulic fracture depicted in FIGS. 1a-1c. As shown in FIGS. 5a-5d, multiple proppant arrangements may be used in conjunction with core samples to evaluate the efficacy of the hydrocarbon recovery agent in enhancing the effective permeability of the hydrocarbon phase in the hydraulic fracture. In one embodiment, proppant arrangements may include high proppant concentration (multilayer) (FIG. 5a), intermediate proppant concentration (full monolayer) (FIG. 5b), low proppant concentration (partial monolayer)(FIG. 5c), and no proppant (FIG. 5d). As one of ordinary skill in the art will appreciate with the benefit of this disclosure, these four arrangements are exemplary and any number of arrangements may be used. Each arrangement is formed from a separate core sample. Fractures of the core samples may be formed, for example and without limitation, by cutting with a precision saw or created in-situ in the core flooding apparatus. After the designated amount of proppant is placed in the created fracture for each arrangement to form propped samples, the propped samples may be covered, such as wrapping with Teflon tape and heat shrink tube, to hold the assembly firmly to form a wrapped core sample. In some embodiments, mesh screens for example, two 200 mesh (70 µm) screens, may be placed at the inlet and outlet faces of each of the wrapped core samples to suppress migration of any proppant and/or shale fragments toward the core holder fittings and production lines. The wrapped core sample is placed into a high pressure, high temperature three-phase miniature core-flooding apparatus integrated with a high-resolution imaging system.

Figure 6:
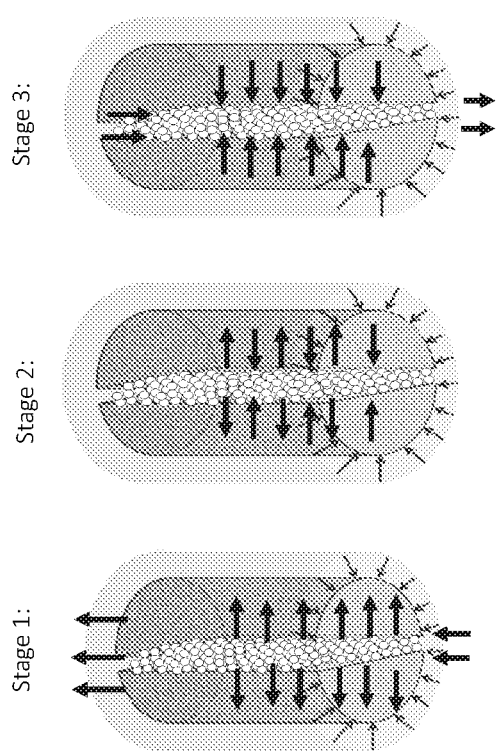
FIG. 6 is a depiction of a laboratory split core flood test which physically simulates the three stages of pressure gradient and fluid flow direction of FIGS. 5a-5d.

FIG. 6 depicts a three stage test can be conducted to simulate the multiphase fluids flow in the hydraulic fracture using the multiple proppant concentration method. In Stage 1, fracturing fluid is pumped to fill the fractures in each of the wrapped core samples. In Stage 2, both of the inlet and outlet of the core flooding system are closed to model a soaking stage. In Stage 3, the core flooding system is opened, and hydrocarbon and fracturing fluid at a predetermined ratio are pumped from the opposite direction as in step 1. Throughout Stages 1-3, the imaging system is applied to visualize the fluid saturation map in the proppant pack. Also the pressure and fluid flow rate are recorded to calculate the effective relative permeability of each phase. As different hydrocarbon recovery agents are used in the multiple proppant concentration method, results in the lowest water saturation and highest effective permeability for the hydrocarbon may be determined.

What is claimed is:

1. A physical modeling method comprising:
   providing a reservoir core plug, the reservoir core plug having a wellbore interface end, an outlet interface end, and a cylindrical face;
   saturating the reservoir core plug with hydrocarbon and brine to form a saturated core plug;
   positioning the saturated core plug within a core-flooding apparatus;
   pumping a fracturing fluid through the saturated core plug to displace a portion of the hydrocarbon to form a displaced hydrocarbon plug;
   sealing the outlet interface end and the cylindrical face
   positioning the displaced hydrocarbon plug in an imbibition cell;
   conducting an imbibition test to form an imbibed core plug having brine and hydrocarbon;
   positioning the imbibed core plug in the core-flooding apparatus; and
   displacing a portion of the brine and hydrocarbon from the imbibed core plug.

2. The physical modeling method of claim 1, wherein the reservoir core plug is saturated with the hydrocarbon and the brine through the wellbore interface end.

3. The physical modeling method of claim 1, further comprising while pumping the fracturing fluid through saturated core plug: collecting displaced hydrocarbon; and recording the amount of displaced hydrocarbon.

4. The physical modeling method of claim 1, further comprising calculating hydrocarbon recovery.

5. The physical modeling method of claim 4, wherein the hydrocarbon recovery is calculated by measuring the weight of the displaced hydrocarbon plug and the imbibed core plug.

6. The physical modeling method of claim 1, wherein in the step of displacing a portion of the brine and hydrocarbon from the imbibed core plug, hydrocarbon is pumped from the outlet interface and both hydrocarbon and brine solution are displaced from the wellbore interface.

7. The physical modeling method of claim 6, wherein the displaced hydrocarbon and brine are collected and hydrocarbon and brine recovery versus time is determined.

8. The physical modeling method of claim 7, wherein effective permeability of the hydrocarbon is determined based on the determination of hydrocarbon and brine recovery versus time.

9. The physical modeling method of claim 1, wherein the saturated core plug is an aged saturated core plug.

10. The physical modeling method of claim 1, wherein the saturated core plug is a non-aged saturated core plug.

11. A physical modeling method comprising:
    providing a reservoir core plug, the reservoir core plug having a wellbore interface end, an outlet interface end, and a cylindrical face;
    saturating the reservoir core plug with hydrocarbon and brine to form a saturated core plug;
    positioning the saturated core plug within a core-flooding apparatus;
    pumping a fracturing fluid through the saturated core plug to displace a portion of the hydrocarbon to form a displaced hydrocarbon plug;
    positioning the displaced hydrocarbon plug in an imbibition cell;
    conducting an imbibition test to form an imbibed core plug having brine and hydrocarbon;
    positioning the imbibed core plug in the core-flooding apparatus;
    displacing a portion of the brine and hydrocarbon from the imbibed core plug; and
    calculating hydrocarbon recovery by measuring the weight of the displaced hydrocarbon plug and the imbibed core plug.

* * * * *